United States Patent
Lane et al.

(10) Patent No.: US 10,112,875 B2
(45) Date of Patent: Oct. 30, 2018

(54) METHOD FOR PROTECTING A HYBRID CERAMIC STRUCTURE FROM MOISTURE ATTACK IN A HIGH TEMPERATURE ENVIRONMENT

(71) Applicant: Siemens Energy, Inc., Orlando, FL (US)

(72) Inventors: Jay E. Lane, Mooresville, IN (US); Gary B. Merrill, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 279 days.

(21) Appl. No.: 15/087,324

(22) Filed: Mar. 31, 2016

(65) Prior Publication Data
US 2016/0207841 A1    Jul. 21, 2016

Related U.S. Application Data

(62) Division of application No. 12/177,531, filed on Jul. 22, 2008, now Pat. No. 9,328,028.

(51) Int. Cl.
| | |
|---|---|
| C04B 41/50 | (2006.01) |
| C04B 41/45 | (2006.01) |
| C04B 41/00 | (2006.01) |
| B32B 18/00 | (2006.01) |
| F01D 5/28 | (2006.01) |

(52) U.S. Cl.
CPC ........ C04B 41/5025 (2013.01); C04B 41/009 (2013.01); C04B 41/457 (2013.01); B32B 18/00 (2013.01); F01D 5/282 (2013.01); Y10T 428/249953 (2015.04)

(58) Field of Classification Search
CPC .......... C04B 41/457; C04B 41/4535–41/4543; C04B 41/4578
See application file for complete search history.

(56) References Cited

U.S. PATENT DOCUMENTS

| | | | |
|---|---|---|---|
| 4,576,836 A | 3/1986 | Colmet et al. | |
| 5,455,106 A | 10/1995 | Steffier | |
| 5,585,165 A | 12/1996 | Kennedy et al. | |
| 6,013,592 A | 1/2000 | Merrill et al. | |
| 6,231,793 B1 | 5/2001 | Strasser et al. | |
| 6,682,820 B1 * | 1/2004 | Pujari | C04B 35/5935 |
| | | | 428/426 |
| 6,696,144 B2 | 2/2004 | Holowczak et al. | |

(Continued)

OTHER PUBLICATIONS

Meter, Pettit and Onal, Interaction of Steam/Air Mixtures with Turbine Airfoil Alloys and Coatings, Final Report: Department of Materials Science & Engineering:University of Pittsburgh, Nov. 15. 2002, 59 pages, Pittsburgh PA 15261.

*Primary Examiner* — Erin Snelting

(57) ABSTRACT

A method for protecting the hybrid ceramic structure from moisture attack in a high temperature combustion environment is provided. The structure includes a ceramic matrix composite (CMC) substrate (12). A thermal insulation material (14) is disposed on the substrate. A vapor resistant material (20) is applied through at least one surface of the hybrid ceramic structure while the hybrid ceramic structure is in a bisque condition that provides a degree of porosity to the hybrid ceramic structure so that the vapor resistant material is infiltrated through interstices available within a thickness of the hybrid ceramic structure.

5 Claims, 2 Drawing Sheets

(56) References Cited

U.S. PATENT DOCUMENTS

| | | |
|---|---|---|
| 6,929,852 B2 | 8/2005 | Lane et al. |
| 7,001,679 B2 | 2/2006 | Campbell et al. |
| 2004/0028941 A1* | 2/2004 | Lane .................... C04B 41/009 428/689 |
| 2006/0019087 A1 | 1/2006 | Mazzola et al. |
| 2009/0220776 A1 | 9/2009 | Meschter et al. |

* cited by examiner

US 10,112,875 B2

METHOD FOR PROTECTING A HYBRID CERAMIC STRUCTURE FROM MOISTURE ATTACK IN A HIGH TEMPERATURE ENVIRONMENT

CROSS-REFERENCE TO RELATED APPLICATIONS

This application is a divisional of application Ser. No. 12/177,531, filed on Jul. 22, 2008, which is incorporated by reference herein.

FIELD OF THE INVENTION

The present invention is generally related to ceramic structures for use in a high temperature combustion environment, and, more particularly, to structural arrangements and techniques for protecting a hybrid ceramic structure from moisture attack in the high temperature combustion environment.

BACKGROUND OF THE INVENTION

Components of gas turbine engines are exposed to very high temperature, high pressure combustion gasses containing moisture, oxygen and other corrosive compounds. Modern gas turbine engines may have firing temperatures that exceed 1,400° C., and temperatures ranging from approximately 1,500° C. to approximately 1,600° C. and higher are expected as the demand for even more efficient engines continues. Cobalt- and nickel-based superalloys are used to form many gas turbine components, but even these superalloy materials need to be aggressively cooled and/or insulated from the hot gas flow to survive long term operation in the combustion environment.

Ceramic matrix composite (CMC) materials have many potential applications in high temperature environments due to their ability to withstand and operate at temperatures in excess of those allowed for a non-insulated superalloy part. However, oxide and non-oxide CMCs can survive temperatures in excess of 1,200° C. for just limited time periods in a combustion environment. Furthermore, oxide-based CMCs cannot be cooled effectively with active cooling systems due to their low thermal conductivity and their limitations in cooling fluid path design due to manufacturing constraints. Non-oxide based CMCs can be aggressively cooled to withstand temperatures above 1200° C., but they are subject to environmental degradation that limits their useful life. To increase the operating temperature range and useful life for CMC materials, a high temperature insulation for a ceramic matrix composite material is described in U.S. Pat. No. 6,013,592.

Structural ceramic technology for gas turbine engines presently relies on silica-based materials. Silica-based non-oxides such as silicon carbide (SiC) and silicon nitride ($Si_3N_4$) are subject to both oxidation and attack by high temperature, high pressure water vapor. In this dual degradation mechanism, the silicon carbide or silicon nitride is oxidized to form a thermally grown oxide ($SiO_2$) layer. This oxide layer then reacts with the high temperature, high pressure water vapor to form a volatile hydroxide species $[Si(OH)_x]$ which is then lost to the environment. Thus, surface recession occurs in a continual process as the protective $SiO_2$ layer volatizes and the base ceramic oxidizes to replenish the lost $SiO_2$. This process is enhanced by the high velocity gas stream in a gas turbine environment. Accordingly, improved materials are needed in advanced combustion turbine engines where firing temperatures may be in the range from approximately 1,500° C. to approximately 1,600° C. and higher.

DETAILED DESCRIPTION OF THE INVENTION

Figure 1:
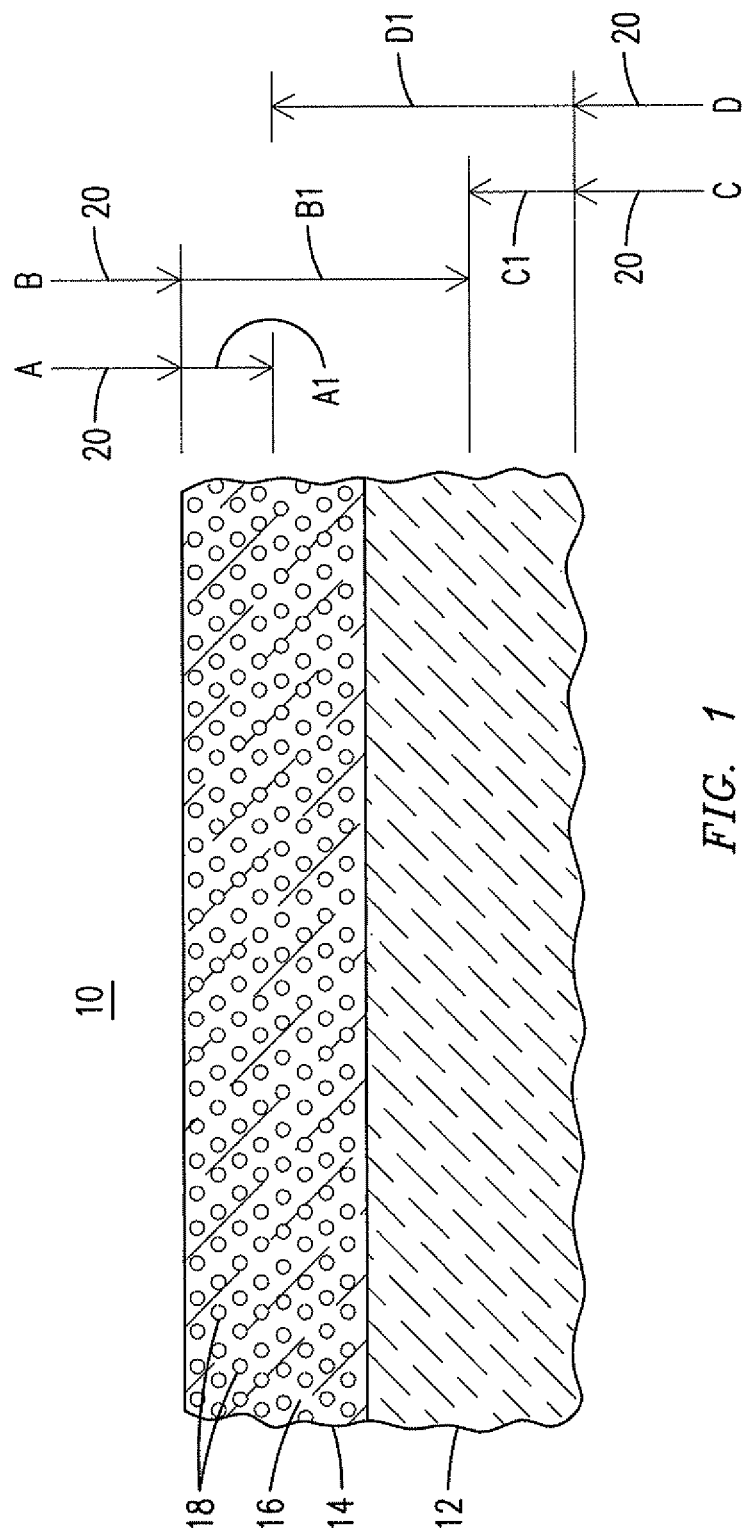
FIG. 1 is a partial cross-sectional view of a hybrid ceramic structure for use in a high temperature combustion environment containing moisture, and includes a conceptual diagram for conceptualizing example structural arrangements that may result from an infiltration of a vapor resistant material into the hybrid ceramic structure, in accordance with aspects of the present invention.

FIG. 1 is a partial cross-sectional view of a hybrid ceramic structure 10 for use in a high temperature combustion environment containing moisture, such as in a gas turbine engine. The hybrid ceramic structure 10 is formed of a substrate 12 of an oxide-based ceramic matrix composite (CMC) material that is thermally protected by a thermal insulation material 14. The ceramic matrix composite substrate 12 and thermal insulation material 14 may be of the type described in U.S. Pat. No. 6,013,592, incorporated by reference herein. Thermal insulation material 14 may be an oxide-based ceramic including a matrix material 16 surrounding a plurality of mullite (or alumina rich mullite) 18 geometric shapes (e.g., spheres). The matrix material 16 may include a mullite or alumina rich mullite filler powder and a phosphate binder or an alumina filler powder and an alumina binder. One or more optional oxide bond layers (not shown) may be disposed between the ceramic matrix composite substrate 12 and the ceramic insulating coating 14 and may comprise one or more of the group of mullite, alumina, and zirconia or other stable oxide materials of similar range coefficients of thermal expansion The hybrid ceramic structure would be susceptible to silica loss and/or recession if it were exposed to very high temperature and atmospheric or high pressure water vapor, such as in the range of 1,500° C.-1,600° C., and higher. Accordingly, the inventors of the present invention propose structural arrangements and techniques to improve the overall resistance of the hybrid ceramic structure to moisture attack. More particularly, the inventors of the present invention have innovatively recognized that there is a window of opportunity prior to a final firing of the hybrid structure where one could introduce a vapor resistant material (e.g., applied as an infiltrant) into the hybrid structure that will increase the resistance of the hybrid structure to moisture attack, without compromising the thermo-mechanical properties or behavior of the hybrid structure. It is believed that previous techniques have been limited to depositing a vapor resistant layer onto a fully-fired structure and therefore have not taken opportunity of some characteristics of the hybrid structure that occur while in a bisque condition, prior to a final firing, as explained in greater detail below.

Generally, the CMC material is thermally processed to a "bisque" condition prior to the application of the thermal insulation material. Typically, at this stage the thermal insulation material is cast onto the bisque-fired CMC and then the hybrid structure is fully fired to develop the full strength of the hybrid structure. At approximately a temperature of 500° C., the thermal insulation material has developed enough "green strength" (e.g., structural strength) to be considered handleable on the CMC substrate. The final firing temperature of the hybrid structure can range from approximately 1250° C. to approximately 1350° C., depending upon the requirements of a given application.

A "bisque condition" as used herein refers to a thermally non-reversible condition where the hybrid structure has developed sufficient structural strength so that an addition of a liquefied infiltrant would not redissolve the hybrid structure. It is noted that the degree of porosity of the hybrid structure in a bisque condition is relatively higher as compared to a fully fired structure (e.g., fully sintered), this allows the vapor resistant material to more readily infiltrate through interstices that may be available within a thickness of the hybrid ceramic structure when in the bisque condition than when the hybrid structure has been fully fired. To put it in another way, the hybrid structure will undergo some shrinkage from the bisque condition to a fully fired condition, which means that the vapor resistant material can more readily infiltrate through the interstices available within the hybrid ceramic structure when in the bisque condition than when the hybrid structure has been fully fired. This follows since during the bisque condition (prior to a final firing) such interstices will comprise a relatively larger volume (bisque-condition volume) as compared to the volume the interstices will have in a fully fired hybrid structure (post final-firing volume). It will be appreciated that such interstices, if left alone, have the potential of becoming moisture-carrying conduits with the deleterious effects to the hybrid structure mentioned above. However, application of a vapor resistant infiltrant would lead to formation of a moisture-resistance layer on the surfaces of the available interstices and/or external surfaces of the hybrid structure and thus provide moisture protection to the overall hybrid structure. It is further contemplated that in some situations the vapor resistant infiltrant could fill up at least some entire interstices and thereby block what otherwise could have potentially become moisture-carrying conduits.

By way of example, the shrinkage of the CMC material that occurs during the final firing can be as high as or higher than 0.45%, for example. Shrinkage of the insulating material 14 will depend upon the methodology used to pack the spheres 18. An insulating material 14 containing close-packed particles 18 may exhibit shrinkage of 0.1% to the fully fired condition. An insulating material 14 that is formed from a pre-mixed slurry without close packing of the spheres 18 may exhibit shrinkage of 0.5% to the fully fired condition.

As represented in the conceptual diagram juxtaposed next to hybrid structure 10, arrows A through D respectively represent a vapor resistant material 20 being applied through at least one surface of the hybrid ceramic structure 10 while the hybrid ceramic structure is in a bisque condition that provides a degree of porosity to the hybrid ceramic structure so that the vapor resistant material is infiltrated through interstices available within a thickness of the hybrid ceramic structure.

Arrow A represents an example embodiment where the vapor resistant material is applied through a surface of the thermal insulation material 14, and the thickness of the hybrid ceramic structure through which the vapor resistant material is infiltrated includes at least a portion of the thermal insulation material 14, as conceptualized by arrow A1.

Arrow B represents an example embodiment where the vapor resistant material 20 is also applied through a surface of the thermal insulation material 14, and the thickness of the hybrid ceramic structure through which the vapor resistant material is infiltrated includes the entire thermal insulation material 14 and at least a portion of the ceramic matrix composite (CMC) substrate 12, as conceptualized by arrow B1.

Arrow C represents an example embodiment where the vapor resistant material 20 is applied through a surface of the ceramic matrix composite (CMC) substrate 12, and the thickness of the hybrid ceramic structure through which the vapor resistant material is infiltrated includes at least a portion of the ceramic matrix composite (CMC) substrate 12, as conceptualized by arrow C1.

Arrow D represents an example embodiment where the vapor resistant material is also applied through a surface of the ceramic matrix composite (CMC) substrate 12, and the thickness of the hybrid ceramic structure through which the vapor resistant material is infiltrated includes the entire ceramic matrix composite (CMC) substrate 12 and at least a portion of the thermal insulation material 14, as conceptualized by arrow D1. It will be appreciated that that the foregoing example embodiments may be performed in combination. For example, the vapor resistant material may be simultaneously applied through respective surfaces of the ceramic matrix composite (CMC) substrate 12 and the thermal insulation material 14.

Figure 2:
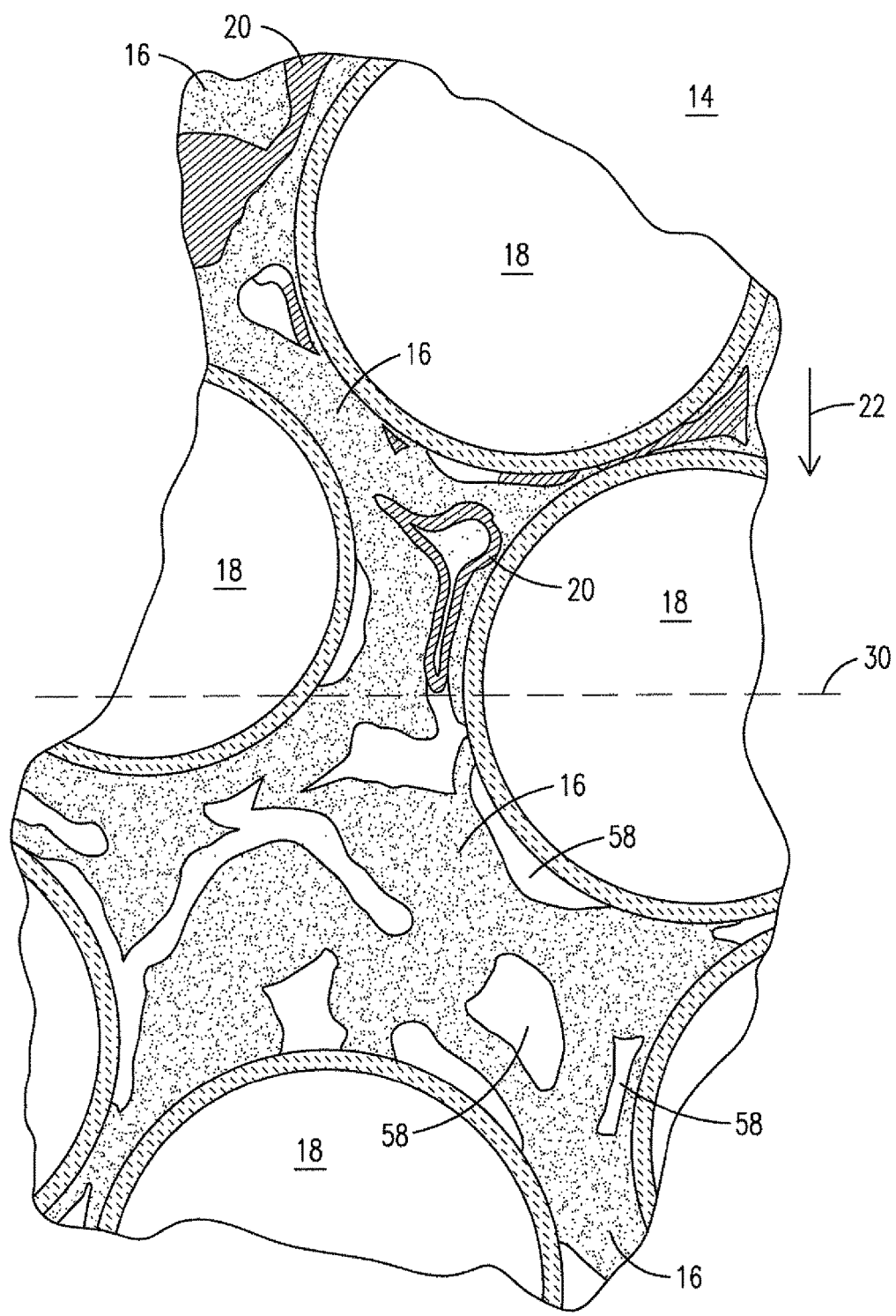
FIG. 2 is a partial cross-sectional view of a thermal insulation material in the hybrid ceramic structure illustrating interstices within the thermal insulation material that may be protected from moisture attack in accordance with aspects of the present invention.

FIG. 2 is an example embodiment of a thermal insulation system 14 including geometric shapes 18 (e.g., ceramic spheres) disposed in a binder material 16 where interstices 58 may be seen. In this example embodiment line 30 represent a thickness of the insulation material up to which the vapor resistant material 20 (in a downwardly flow direction as represented by arrow 22) has substantially infiltrated to either fill-in and/or form a moisture-resistant coating on surfaces of interstices available within such a thickness. It is noted that the body of the binder material 16 (e.g., above line 30 in FIG. 2) may further be densified by a microscopic coating of vapor resistant material that infiltrates into such a body.

Example compositions of vapor resistant materials that may be applied while the hybrid ceramic structure is in a bisque condition could be but are not limited to: pyrochlore structures; $HfSiO_4$; $ZrSiO_4$; $Y_2Si_2O_7$; $Y_2O_3$; $ZrO_2$, $HfO_2$; yttria and/or $ZrO_2$ fully or partially stabilized by rare earth elements; yttria and/or HfO2 partially or fully stabilized by rare earth elements, yttria and/or $ZrO_2/HfO_2$ partially or fully stabilized by rare earth elements; yttrium aluminum garnet; rare earth silicates of the form $RE_2Si_2O_7$; rare earth oxides of the form $RE_2O_3$; rare earth zirconates or hafnates of the form $RE_4Zr_3O_{12}$ or $RE_4Hf_3O_{12}$, where the rare earth elements may be one or more of the following: Ce, Pr, Nd, Sm, Eu, Gd, Tb, Dy, Ho, Er, Tm, Yb, Lu.

As will be appreciated by one skilled in the art, the particular process for applying the vapor resistant material to infiltrate the hybrid ceramic structure may take various forms each well-understood by one skilled in the art, such as by way of an application of a liquefied form to the surface and then infiltration by means of vacuum or pressure infiltration, capillary wicking and sol gel. Application of the vapor resistant material to the substrate may be carried out by soaking, spraying or painting. Significantly, the process for applying the vapor resistant material is preferably performed when the hybrid ceramic structure is in bisque condition, e.g., less than a fully-fired condition.

In one example embodiment, the vapor resistant material may be applied to the hybrid ceramic structure (e.g., CMC substrate and/or thermal insulation material) in an example temperature range from a temperature of approximately 500° C. to approximately 1350° C.

In another example embodiment, the vapor resistant material may be applied to the hybrid ceramic structure when such structure has experienced less than 75% of the shrinkage experienced by a fully-fired hybrid structure. In other example embodiments, the vapor resistant material may be respectively applied to the hybrid ceramic structure at less than 50%, 25% or 10% of the shrinkage experienced by the fully-fired hybrid CMC structure.

In one example embodiment, the infiltrant may be chemically adapted to allow an oxide constituent to be thinly deposited on the foregoing surfaces of the hybrid structure. In the event a sol-gel process is used, one example process may be to hydrolyze a suitable alkoxide in liquid form to form an in-situ gel within the hybrid structure. Another technique may be suspending nano-sized particles in a slurry that may be chemically modified (or just infiltrated) to form internal and/or external moisture-protection layers within the hybrid structure. A gelation step may be optionally performed to stabilize the infiltrant throughout the internal surfaces and prevent infiltrant segregation during drying. After infiltration and drying, the hybrid structure is thermally processed under normal firing conditions resulting in a hybrid ceramic structure with a fully stabilized vapor resisting coating or filling formed on interstices available within the hybrid structure, as well as external surfaces of the hybrid structure.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A method for protecting a hybrid ceramic structure from moisture attack in a high temperature combustion environment containing moisture, the hybrid ceramic structure comprising a ceramic matrix composite substrate and a thermal insulation material disposed on the substrate, the method comprising:
   processing the hybrid ceramic structure to be in a bisque condition that provides a degree of porosity to the hybrid ceramic structure;
   applying a vapor resistant material through surfaces of the thermal insulation material and the ceramic matrix composite substrate while the hybrid ceramic structure is in the bisque condition;
   as a result of the degree of porosity provided by the bisque condition, infiltrating the vapor resistant material through interstices available within a thickness of the hybrid ceramic structure; and
   sintering the hybrid ceramic structure to a fully sintered condition.

2. The method of claim 1, wherein the applying of the vapor resistant material comprises applying the vapor resistant material when the hybrid ceramic structure is in a temperature range from 500° C. to 1350° C.

3. The method of claim 1, wherein the infiltrating of the vapor resistant material comprises partially filling at least some of the interstices available within the thickness of the hybrid ceramic structure.

4. The method of claim 1, wherein the infiltrating of the vapor resistant material comprises filling at least some of the interstices available within the thickness of the hybrid ceramic structure.

5. The method of claim 1, wherein the infiltrating of the vapor resistant material comprises infiltrating into a binder material of the thermal insulation material where a plurality of geometric shapes is packed, the infiltrating into the binder material incrementing a densification level of a body formed by the binder material.

* * * * *